(12) United States Patent
Shigeoka

(10) Patent No.: US 10,868,963 B2
(45) Date of Patent: Dec. 15, 2020

(54) METHODS AND APPARATUS FOR A PROCESSING CIRCUIT

(71) Applicant: SEMICONDUCTOR COMPONENTS INDUSTRIES, LLC, Phoenix, AZ (US)

(72) Inventor: Yukihiko Shigeoka, Godo-cho (JP)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 0 days.

(21) Appl. No.: 16/353,665

(22) Filed: Mar. 14, 2019

(65) Prior Publication Data

US 2019/0215458 A1 Jul. 11, 2019

Related U.S. Application Data

(63) Continuation of application No. 15/427,172, filed on Feb. 8, 2017, now Pat. No. 10,277,821.

(60) Provisional application No. 62/324,523, filed on Apr. 19, 2016.

(51) Int. Cl.
  *H04N 5/232* (2006.01)
  *H04N 5/243* (2006.01)

(52) U.S. Cl.
  CPC ..... *H04N 5/23287* (2013.01); *H04N 5/23258* (2013.01); *H04N 5/243* (2013.01)

(58) Field of Classification Search
  CPC .......... H01Q 1/06; H01Q 1/242; H04M 1/22; H04M 1/72519; H04N 5/23258; H04N 5/23287; H04N 5/243
  See application file for complete search history.

(56) References Cited

U.S. PATENT DOCUMENTS

| 4,694,696 | A | * | 9/1987 | Hojo | G01P 1/006 73/497 |
| 5,590,241 | A | * | 12/1996 | Park | G10L 15/20 381/94.7 |
| 5,805,212 | A | * | 9/1998 | Fujiwara | H04N 5/23248 348/208.3 |
| 5,872,439 | A | * | 2/1999 | Nomura | G05B 13/04 318/632 |
| 6,208,377 | B1 | | 3/2001 | Morofuji | |
| 6,343,188 | B1 | | 1/2002 | Morofuji | |

(Continued)

FOREIGN PATENT DOCUMENTS

| JP | 2014-057371 A | 3/2014 |
| JP | 2015-075617 A | 4/2015 |

*Primary Examiner* — Chiawei Chen
(74) *Attorney, Agent, or Firm* — The Noblitt Group, PLLC; Hettie L. Haines

(57) ABSTRACT

Various embodiments of the present technology may provide a method and apparatus for a processing circuit. The processing circuit may include an amplifier and other processing circuitry that operate together to process and/or adjust a gyro signal. The processing circuit may include an integration circuit configured to compute a first value and adjust the first value to a predetermined maximum value if the first value is greater than the predetermined maximum value. The processing circuit may also include a gain control circuit configured to compute a first coefficient based on the first value; select one of: the first coefficient and a second coefficient; and adjust a gain of the amplifier according to the selected coefficient.

20 Claims, 7 Drawing Sheets

(56) References Cited

U.S. PATENT DOCUMENTS

| | | | | |
|---|---|---|---|---|
| 6,392,584 | B1* | 5/2002 | Eklund | G01H 1/003 |
| | | | | 341/183 |
| 6,630,950 | B1* | 10/2003 | Ohkawara | H04N 5/23248 |
| | | | | 348/208.11 |
| 6,734,901 | B1* | 5/2004 | Kudo | H04N 5/23248 |
| | | | | 348/208.1 |
| 8,558,901 | B2* | 10/2013 | Yamada | G03B 5/00 |
| | | | | 348/208.2 |
| 10,457,322 | B2* | 10/2019 | Yoshida | H02P 21/22 |
| 2009/0160950 | A1* | 6/2009 | Watanabe | H04N 5/23287 |
| | | | | 348/208.4 |
| 2009/0160958 | A1 | 6/2009 | Yamada | |
| 2009/0160959 | A1* | 6/2009 | Watanabe | H04N 5/2254 |
| | | | | 348/208.99 |
| 2010/0002088 | A1 | 1/2010 | Ohta | |
| 2011/0102612 | A1 | 5/2011 | Iwata | |
| 2011/0105181 | A1* | 5/2011 | McLeod | H04N 5/23254 |
| | | | | 455/556.1 |
| 2012/0315025 | A1 | 12/2012 | Wakamatsu | |
| 2013/0004150 | A1 | 1/2013 | Wakamatsu | |
| 2013/0141603 | A1 | 6/2013 | Imada | |
| 2013/0163084 | A1 | 6/2013 | Miyazawa | |
| 2013/0163972 | A1 | 6/2013 | Miyazawa | |
| 2013/0268227 | A1* | 10/2013 | Opris | G01C 19/5726 |
| | | | | 702/104 |
| 2014/0111658 | A1 | 4/2014 | Watanabe | |
| 2014/0320680 | A1 | 10/2014 | Shibata | |
| 2015/0036011 | A1 | 2/2015 | Wakamatsu | |
| 2015/0042828 | A1 | 2/2015 | Wakamatsu | |
| 2015/0281580 | A1* | 10/2015 | Karpenko | H04N 5/23258 |
| | | | | 348/208.2 |
| 2016/0327806 | A1 | 11/2016 | Kasamatsu | |
| 2017/0288915 | A1* | 10/2017 | Aravind | H04L 25/03057 |

* cited by examiner

METHODS AND APPARATUS FOR A PROCESSING CIRCUIT

CROSS-REFERENCE TO RELATED APPLICATION

This application is a continuation of U.S. patent application Ser. No. 15/427,172, filed on Feb. 8, 2017, which claims the benefit of U.S. Provisional Patent Application Ser. No. 62/324,523, filed on Apr. 19, 2016, and incorporates the disclosure of the application in its entirety by reference.

BACKGROUND OF THE TECHNOLOGY

Electronic devices, such as cellular telephones, cameras, and computers, commonly use image sensors to capture images. Many imaging systems employ image stabilization technology to counteract hand jitter and other involuntary motions, which may result in blurred pictures or video.

Optical image stabilization (OIS) systems sense vibrations on the host device and employ electro-mechanical methods that act directly on the lens position itself to compensate for these movements to reduce the blurring effects from involuntary hand motion or shaking of the device. In general, the stabilization capabilities of the OIS system are limited by the physical space occupied by the lens, as other components of the host device may be adjacent to the lens and limit the movement of the lens in any particular direction.

SUMMARY OF THE INVENTION

Various embodiments of the present technology may provide a method and apparatus for a processing circuit. The processing circuit may include an amplifier and other processing circuitry that operate together to process and/or adjust a gyro signal. The processing circuit may include an integration circuit configured to compute a first value and adjust the first value to a predetermined maximum value if the first value is greater than the predetermined maximum value. The processing circuit may also include a gain control circuit configured to compute a first coefficient based on the first value; select one of: the first coefficient and a second coefficient; and adjust a gain of the amplifier according to the selected coefficient.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

FIG. 1 representatively illustrates an imaging system in accordance with an exemplary embodiment of the present technology;

Figure 6:
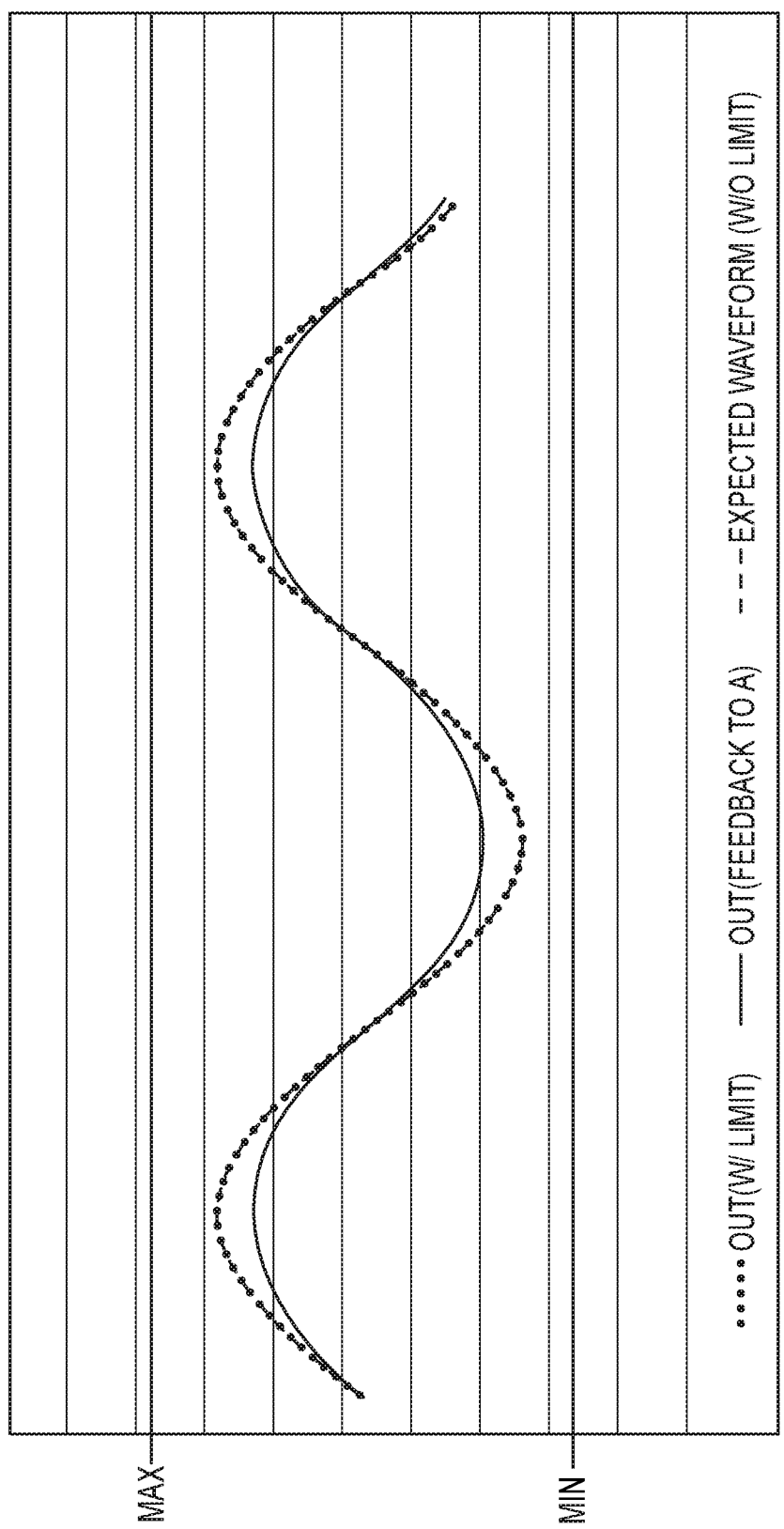
Figure 7:
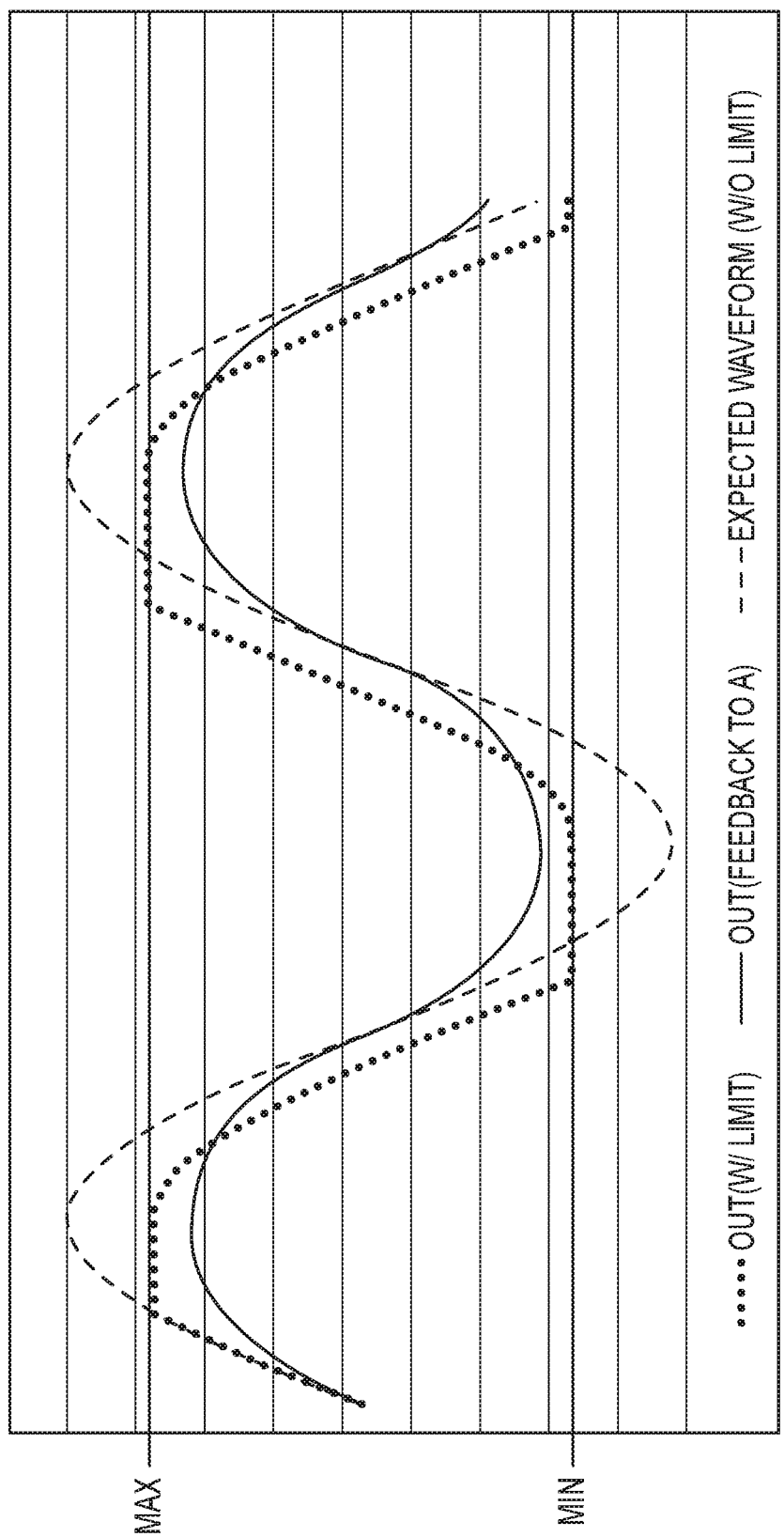

FIG. 6 is a graphical illustration of an input signal within a threshold range and a corresponding output signal of an OIS system in accordance with an exemplary embodiment of the present technology; and FIG. 7 is a graphical illustration of an input signal exceeding the threshold range and a corresponding output signal of an OIS system in accordance with an exemplary embodiment of the present technology.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various sampling circuits, analog-to-digital converters, semiconductor devices, such as transistors, capacitors, image processing units, and the like, which may carry out a variety of functions. In addition, the present technology may be practiced in conjunction with any number of systems, such as automotive, aerospace, medical, scientific, surveillance, and consumer electronics, and the systems described are merely exemplary applications for the technology. Further, the present technology may employ any number of conventional techniques for capturing image data, sampling image data, processing image data, and the like.

Figure 1:
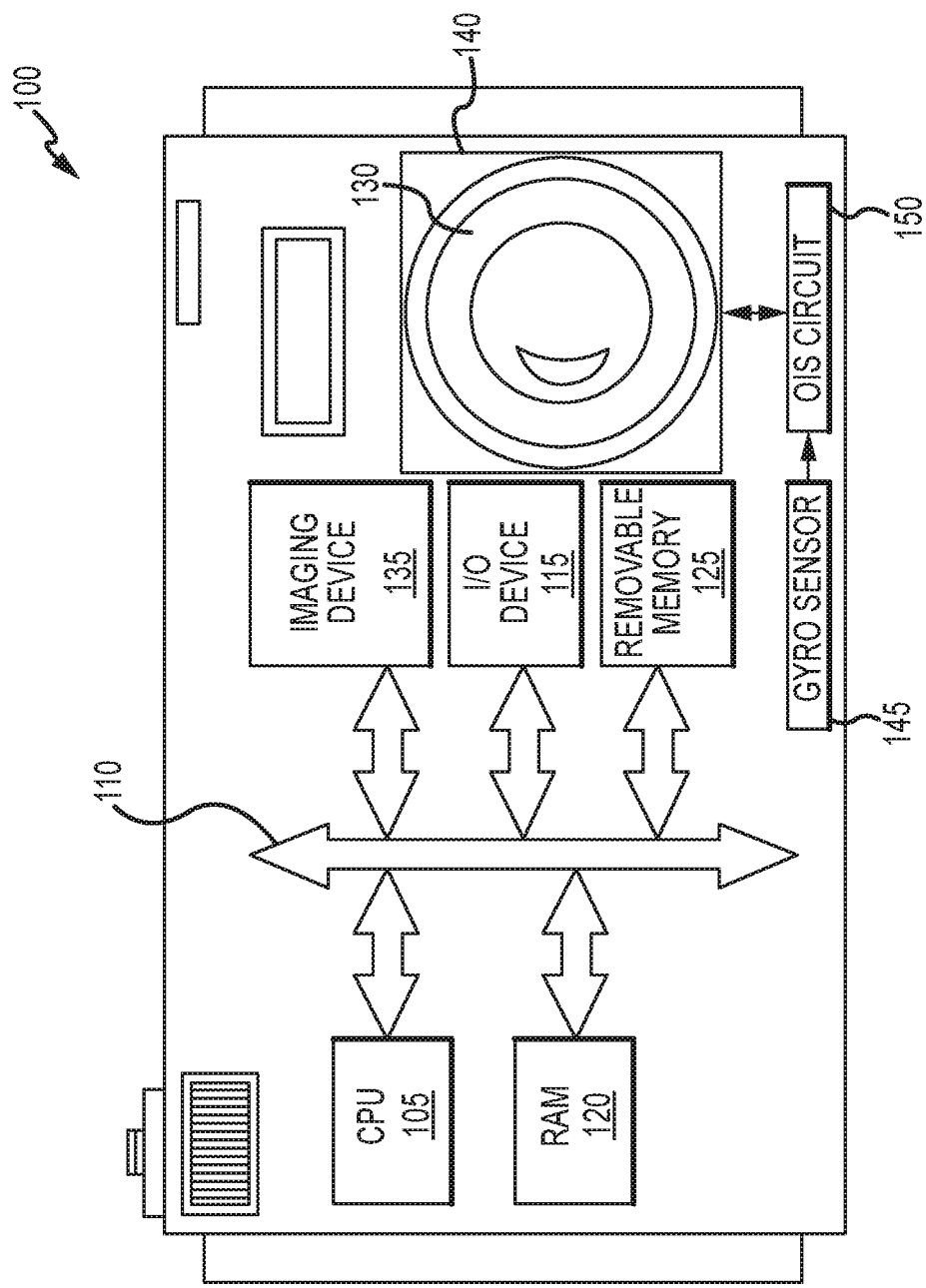
Figure 2:
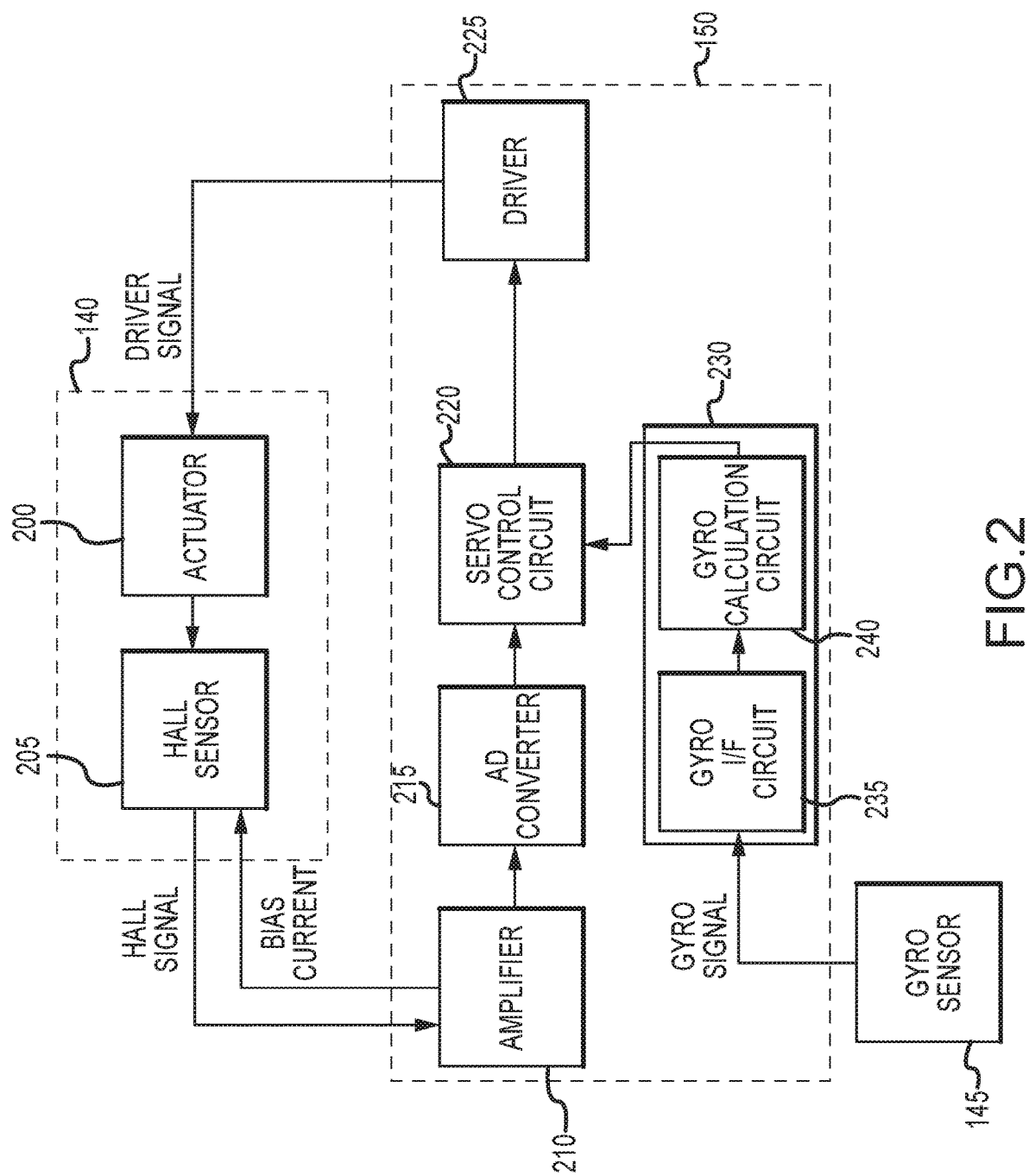
FIG. 2 is a block diagram of an optical image stabilization system in accordance with an exemplary embodiment of the present technology.

Methods and apparatus for optical image stabilization according to various aspects of the present technology may operate in conjunction with any suitable electronic system, such as imaging systems, "smart devices," wearables, consumer electronics, and the like. Referring to FIGS. 1 and 2, an exemplary system may comprise an electronic device, such as a digital camera 100. In one embodiment, the system may comprise a central processing unit (CPU) 105 that communicates with various devices over a bus 110. Some of the devices connected to the bus 110 may provide communication into and out of the system, for example an input/output (I/O) device 115. Other devices connected to the bus 110 provide memory, for example a random access memory (RAM) 120, hard drive, and one or more peripheral memory devices 125, such as a USB drive, memory card, and SD card. While the bus 110 is illustrated as a single bus, any number of busses may be used to provide communication paths to interconnect the devices.

The system may further comprise an image sensor 135 for capturing image data. For example, the image sensor 135 may comprise a pixel array (not shown) to detect the light and convey information that constitutes an image by converting the variable attenuation of waves (as they pass through or reflect off object) into electrical signals. The pixel array may comprise a plurality of pixels arranged in rows and columns, and the pixel array may contain any number of rows and columns, for example, hundreds or thousands of rows and columns. Each pixel may comprise any suitable photosensor, such as a photogate, a photodiode, and the like, to detect light and convert the detected light into a charge. The image sensor 135 may be implemented in conjunction with any appropriate technology, such as active pixel sensors in complementary metal-oxide-semiconductors (CMOS) and charge-coupled devices.

The system may further comprise a lens module 140 to focus light on the image sensor 135. For example, the lens module 140 may comprise a lens 130, with a fixed diameter, positioned adjacent to a sensing surface of the image sensor 135. The lens module 140 may further comprise a sensor, such as a hall sensor 205, to detect movement and a position of the lens 130, and an actuator 200, such as a voice coil motor (VCM), to reposition the lens 130. The actuator 200 may be configured to move the lens 130 along various axes within a predetermined range. The actuator 200 may be limited in the amount of movement it can perform, whether self-limiting or due to the design of the system. For example, the VCM may be limited to a maximum movement of 1.5 degrees, 3 degrees, 6 degrees, etc. from an initial reference point.

The lens module 140 may comprise a housing (not shown) with sidewalls to house the lens 130, the actuator 200, and the hall sensor 205. In general, the lens 130 is positioned perpendicular to the sidewalls, such that the sidewalls surround the lens 130, and the housing is larger than the diameter of the lens 130. As such, the range of movement by the actuator 200 on the lens 130 may be limited by the distance from an outer perimeter of the lens 130 to the sidewalls.

The system may further comprise various sensors to detect movement of the camera 100 and circuits configured to counteract the detected movement. For example, the system may comprise a gyro sensor 145 and an OIS circuit 150 coupled to the lens module 140.

The gyro sensor 145 detects an angular velocity (e.g., movement caused by shaking/vibrations) of the camera 100 and transmits a gyro signal, representing the angular velocity of the camera 100, to the OIS circuit 150. The gyros sensor 145 may detect the angular velocity due to the Coriolis force that is applied to a vibrating element. This motion produces a potential difference from which the angular velocity is sensed. The gyro sensor 145 may comprise any suitable sensor configured to detect vibrations produced by external factors and transmit the vibration data as an electrical signal to the OIS circuit 150. The gyro sensor 145 may be selected according to a particular application and may be selected according to various specifications, such as sensing range, output type, supply current, operating temperature and the like.

The OIS receives, processes, and transmits various signals to and from the lens module 140 to reposition the lens 130 in response to the various signals. For example, the OIS circuit 150 may process the vibration data from the gyro sensor 145, as well a signal from the lens module 140, such as a hall signal from the hall sensor 205.

In an exemplary embodiment, the OIS circuit 150 may comprise various circuits to perform processing, auto focus operations, and/or logic functions. For example, the OIS circuit 150 may comprise an amplifier 210, an analog-to-digital converter (ADC) 215, a servo control circuit 220, a driver 225, and a gyro filter 230. In various embodiments, the amplifier 210, the analog-to-digital converter (ADC) 215, the servo control circuit 220, and the driver 225 operate together to perform auto focus and/or OIS functions.

The amplifier 210 may comprise any suitable device configured to receive a signal and output an amplified version of the signal. For example, the amplifier 210 may be coupled to and configured to amplify the hall signal received from the hall sensor 205. In various embodiments, the amplifier 210 may be further configured to transmit a bias current signal to the hall sensor 205. The amplifier 210 may adjust the value of the bias current signal to fine-tune the hall signal. The amplifier 210 may be configured to output any suitable amplified signal such as an analog or digital signal. For example, in one embodiment, the amplifier 210 may be coupled to the ADC 215 and be suitably configured to transmit an analog signal to the ADC 215.

The ADC 215 converts an analog signal to a digital signal. The ADC 215 may receive the analog signal from the amplifier 210. The ADC 215 may comprise any suitable device for converting an analog signal to a digital signal and may be selected according to a particular application. In one embodiment, the ADC 215 may convert the analog signal received from the amplifier 210 into a digital output signal before transmitting the digital output signal to the servo control circuit 220.

The servo control circuit 220 performs various functions on the signal received from the ADC 215, such as DC gain boost, phase compensation, and gain compensation. The servo control circuit 220 may further calculate an appropriate power output based on the difference between the position information from the hall sensor 205 and the signal from the gyro filter 230. The servo control circuit 220 may comprise any suitable device for performing signal compensation functions and logic functions. The servo control circuit 220 may transmit a control signal to the driver 225 indicating the appropriate output power that the driver 225 provides to the actuator 200.

The driver 225 controls and supplies power to various devices within the system. For example, the driver 225 may supply power to the actuator 200 according to the control signal that the driver 225 receives from the servo control circuit 220. The driver 225 may comprise any suitable control device or system capable of providing energy to the actuator 200 and/or any other components or devices within the system.

The gyro filter 230 performs various functions on a signal (e.g., the gyro signal), such as integration, gain adjustment, and frequency characteristic adjustment (i.e., DC cutting). For example, the gyro filter 230 may integrate an angular velocity and prevent transmission of gyro signals at undesired frequencies. The gyro filter 230 may be coupled between the gyro sensor 145 and the servo control circuit 220. In an exemplary embodiment, the gyro filter 230 comprises an interface (I/F) circuit 235 and a gyro calculation circuit 240.

The I/F circuit 235 connects various devices and/or circuits together to allow the devices to operate with each other. The I/F circuit 235 may comprise various input and output ports to connect the various devices and/or circuits. The I/F circuit 235 may be configured to convert a voltage and/or a current from one device and/or circuit to an equivalent voltage and/or current of another device and/or circuit. In an exemplary embodiment, the I/F circuit 235 may be coupled to the gyro sensor 145 to receive input information about the environment, such as the movement (angular velocity) of the camera 100, and may convert the input information to output information that can be utilized by the gyro calculation circuit 240.

Figure 3:
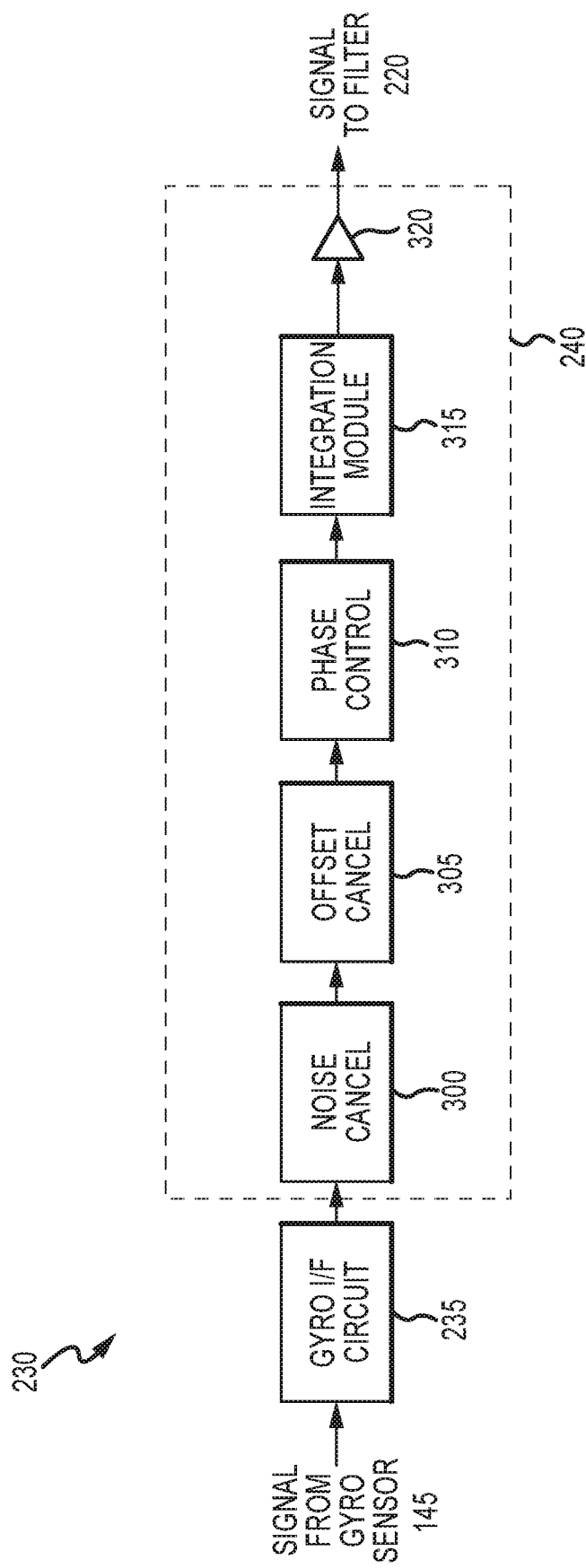
FIG. 3 is a block diagram of a gyro filter in accordance with an exemplary embodiment of the present technology.

The gyro calculation circuit 240 performs various signal processing functions, such as noise cancellation, offset cancellation, phase control, integration, and amplification. The gyro calculation circuit 240 may be coupled between an output of the I/F circuit 235 and an input of the servo control circuit 220. For example, and referring to FIG. 3, the gyro calculation circuit 240 may comprise a first circuit 300 to perform noise cancellation, a second circuit 305 to perform offset cancellation, a third circuit 310 to perform phase control, and a fourth circuit 320 to perform amplification.

The first, second, third, and fourth circuits 300, 305, 310, 320 may comprise any suitable device and/or system to perform their specific function.

The gyro calculation circuit 240 may further comprise an integration module 315 to perform integration and gain adjustment. The integration module 315 may be coupled to an output of at least one of the first, second or third circuits 300, 305, 310. In an exemplary embodiment, the output of the third circuit 310 is coupled to an input of the integration module 315. For example, after the gyro signal has been processed with the first, second, and third circuits 300, 305, 310, the gyro signal may be transmitted to the integration module 315. In various embodiments, the integration module 315 may be coupled to the fourth circuit 320. For example, an output signal ("OUT") of the integration module 315 may be transmitted to the fourth circuit 320, wherein the fourth circuit 320 further amplifies the output signal of the integration module 315. The integration module 315 may comprise any suitable device and/or system to integrate a signal and adjust the gain of a signal. For example, and referring to FIG. 4, the integration module 315 may comprise a first gain element 465, an integration circuit 455, and a gain control circuit 460.

The first gain element 465 may receive and amplify an input signal (e.g., the output signal of the third circuit 310) according to a gain coefficient ("coefficient A"). In an exemplary embodiment, the first gain element 465 may be configured as an adjustable gain element, wherein the coefficient A may be adjusted. An input terminal of the first gain element 465 may be coupled to an output terminal of the third circuit 310. The first gain element 465 may comprise any suitable device and/or system for providing adjustable gain.

The integration circuit 455 integrates a signal over a predetermined period of time. In an exemplary embodiment, the integration circuit 455 integrates the gyro signal from the gyro sensor 145. The integration circuit 455 may also comprise a device for limiting the signal to a maximum value. For example, the integration circuit 455 may comprise an adder 410, a limiter 400, a first storage device 405, and a second gain element 470.

The adder 410 may comprise any suitable system or device configured to add two or more values. For example, the adder 410 may add an output value from the first gain element 465 to an output value of the second gain element 470 to facilitate the integration process. The adder 410 may be coupled between the output terminals of first and second gain elements 465, 470 and may also be coupled to an input terminal of the limiter 400.

The limiter 400 may limit the signal from the adder 410 to a maximum value ("$Limit_{max}$") that corresponds to a maximum distance that the actuator 200 (FIG. 1) is able to move. The maximum distance may be based on the physical characteristics of the actuator 200, operating characteristics of the actuator 200, and/or characteristics of other components within the system. The limiter 400 may limit the output of the integration circuit 455 to be commensurate with the limitations of the actuator 200. An output terminal of the limiter 400 may be further coupled to an input terminal of the first storage device 405.

The second gain element 470 may amplify a value according to a gain coefficient ("coefficient C"). Coefficient C may be set according to a particular application, and may be based on the type of actuator 200, the characteristics of the gyro sensor 145, desired amplification, and the like. In an exemplary embodiment, the second gain element 470 is coupled between the first storage device 405 and the adder 410, wherein the second gain element 470 receives and amplifies data from the first storage device 405.

The first storage device 405 may store a value ("Y"). The first storage device 405 may comprise a memory cell, for example RAM. In an exemplary embodiment, the first storage device 405 is coupled to the output terminal of the limiter 400 and stores an output value of the limiter 400. The first storage device 405 may be continuously updated with new values as the gyro signal is integrated over time. For example, a current value stored in the first storage device 405 may be amplified by the second gain element 470 and then added to the output value of the first gain element 465 by the adder 410. The result of this computation may or may not be limited by the limiter 400. As such, the output of the limiter 400 replaces the current value stored in the first storage device 405 with a new value.

The gain control circuit 460 controls coefficient A of the first gain element 465 and monitors the value Y stored in the first storage device 405. The gain control circuit 460 may be configured to compute a new coefficient A ("$coefA_{new}$") and selectively set the gain of the first gain element 465 to one of the new coefficient A or a starting coefficient A ("$coefA_{start}$"). In an exemplary embodiment, the new coefficient A may be computed according to the following equation:

$$coefA_{new} = coefA_{start} - (|Y| - Limit_{min})*G,$$

where Y is the value stored in the first storage device 405, $Limit_{min}$ is a secondary limit, G represents a multiplier, and the $coefA_{start}$ is the starting coefficient of the first gain element 465.

The gain control circuit 460 may comprise any devices and/or systems suitable for computing the equation above. For example, the gain control circuit 460 may comprise an absolute value circuit 420, a second storage device 440, first subtraction circuit 425, second subtraction circuit 435, a third gain element 430, a third storage device 445, a comparator 450, and a switch 475 configured to produce the new coefficient A and selectively apply the new coefficient A to the first gain element 465.

The absolute value circuit 420 may be configured to output the absolute value of an input value, for example the absolute value circuit 420 may compute the absolute value of Y. The absolute value circuit 420 may comprise any suitable device or system for determining an absolute value. The second storage device 440 may store the secondary limit value ($Limit_{min}$). The secondary limit is a predetermined value that is less than the maximum limit ($Limit_{max}$) of the actuator 200 and is selected according to the specifications of the actuator 200 and desired control of coefficient A.

The third gain element 430 may have a gain ("G", "gain variable") and amplifies a value. The value of G may be selected according to any desired operating characteristics, physical or electrical device characteristics, and the like. According to various embodiments, G may be selected according to the starting coefficient A (coefAstart) and a desired minimum coefficient A. For example, G may be calculated by solving for G in the equation above when the starting coefficient A and the desired minimum coefficient A are known. For example, if coefAstart is 1.0, the desired minimum coefficient A is 0.5, Limitmin is set to 0.3, and the maximum limit (Limitmax) is set to 2.0 (which is also the maximum value that can be stored in the first storage device 405), then G equals 0.294. The maximum limit (Limitmax) may be used to determine G because large movements that create a input signal (e.g., the gyro signal) that exceeds the maximum limit, and then limited by the limiter 400, result in the input from the gyro sensor 145 being reduced by a factor—in this case, if the coefficient A is 0.5, then the input (e.g., the gyro signal) from the gyro sensor 145 would be halved. As such, the value for G may be selected to account for such events. The third gain element 430 may comprise any suitable device or system configured to amplify an input signal and/or value, such as a value output from the first subtraction circuit 425.

The third storage device 445 stores a value. For example, the third storage device 445 may store the starting coefficient A (coefA$_{start}$). The third storage device 445 may comprise any suitable memory, such as RAM. The third storage device 445 may be coupled to a switch terminal (e.g., "0"), wherein the value stored in the third storage device 445 may be accessed by the switch 475.

The comparator 450 may compare two values, for example the absolute value of Y and Limit$_{min}$. The comparator 450 may output a value based on the relationship between the compared values. For example, the comparator 450 may output a "0" if the absolute value of Y is less than (or equal to) Limit$_{min}$, and may output a "1" if the absolute value of Y is greater than (or equal to) Limit$_{min}$. The particular comparator 450 outputs with respect to the absolute value of Y may be selected according to desired device parameters, operating characteristics, and the like.

The comparator 450 may be communicatively coupled to the switch 475, wherein the switch 475 receives a comparator signal from the comparator 450 and responds accordingly. For example, the switch 475 may respond to the comparator 450 by selecting one of two terminals, wherein one terminal represents the new coefficient A, as described above, and the second terminal represents the starting coefficient A. The switch 475 may further be communicatively coupled to the first gain element 465, such that coefficient A of the first gain element 465 is set according to the selection of the switch 475.

The first subtraction circuit 425 and the second subtraction circuit 435 to perform a subtraction function to realize the equation for the new coefficient A described above. The first subtraction circuit 425 may be coupled to the absolute value circuit 420, the second storage device 440, and an input terminal of the third gain element 430. The first subtraction circuit 425 may receive the values stored in the absolute value circuit 420 and the second storage device 440 to perform subtraction on a portion of the equation above. The second subtraction circuit 435 may be coupled to an output terminal of the third gain element 430, the third storage device 445, and a switch terminal (e.g., "1"). The second subtraction circuit 435 may receive the output value from the third gain element 430 and the value stored in the third storage device 445 to perform subtraction on a different portion of the equation.

Referring again to FIG. 3, the gyro calculation circuit 240 may further comprise a fourth gain element 320 with a gain coefficient ("coefficient Z"). The fourth gain element 320 may be coupled to the output of the integration module 315 and may be configured to amplify the output signal ("OUT") from the integration module 315 (which is also the output signal from the integration circuit 455). An output terminal of the fourth gain element 320 may be coupled to the servo control circuit 220. The fourth gain element 320 may comprise any device or system suitable for amplifying a signal.

In operation, and referring to FIGS. 1, 2, 4, and 5, the integration module 315 may accumulate the angular velocity data that it receives over time. The integration module 315 outputs a signal that relates to the amount of movement the device 100 experiences over time, and facilitates compensation of the lens 130 and/or image sensor 135 position to counteract the movement.

In an exemplary embodiment, the integration module 315 may receive angular velocity measurements (i.e., the gyro signal) from the gyro sensor 145 at a particular sampling rate, for example 5 KHz or 8 KHz. Each sample represents an amount of angular movement of the device 100, and can be positive or negative (and there may be more than one direction angular movement is measured with respect to). A given sample is accumulated with previously received samples from the first storage device 405, which is then compared to a specified limit by the limiter 400 and limited if necessary, and then stored in the first storage device 405. Accumulating the samples provides an approximation of the total angular movement the device 100 has experienced. The output of the integration module 315 (e.g., the output of the limiter 400) therefore corresponds to an amount of movement of the lens 130 and/or image sensor 135 necessary to reduce or negate the visual effect of movement experienced by the device 100. This facilitates image stabilization.

In general, it is possible that the movement of the device 100 may exceed the ability of the actuator 200 to compensate for the movement. If the samples from the gyro sensor 145 are simply accumulated, the output value of the integration module 315 may be limited by the limiter 400 rather quickly. In this case, the actuator 200 may be pushed to its maximum limit quickly with a large movement, and will not be able to compensate for further movement in the same direction. For example, and referring to FIGS. 6 and 7, the dotted line represents simply accumulating the samples and limiting the output of the integration module 315 with the limiter 400 and not adjusting any coefficients, the dashed line represents an ideal output ("expected waveform") if the actuator 200 was capable of fully responding to the integration module 315 output. When the input movement (e.g., data provided by the gyro sensor 145) does not exceed the limiter 400 (i.e., is within a threshold range—between a minimum value and a maximum value), for example as illustrated in FIG. 6, the output (e.g., data provided by the integration module 315) can effectively compensate for the movement of the device 100 and the waveforms overlap. When the input movement exceeds the limiter 400 (i.e., exceeds the threshold range), for example as illustrated in FIG. 7, the output is capped for a significant portion of the time. If this represents an imaging device taking a video, only some of the video will be stabilized, and the video will still have a large amount of visible movement. It may appear to be jerky and disorienting, and this outcome is generally not desirable.

Systems and methods according to various embodiments of the present technology may have an output waveform that is not capped as a result of the minimum and maximum values (i.e., limitations, threshold range) of the actuator 200 and overlaps an expected output waveform for a case where the actuator 200 has no limitations. For example, the output signal ("OUT") of the integration module 315 according to various embodiments of the present technology may be represented by the waveforms with solid lines in FIGS. 6 and 7, wherein the coefficient A of the first gain element 465 is adjusted according to the gain control circuit 460.

Figure 4:
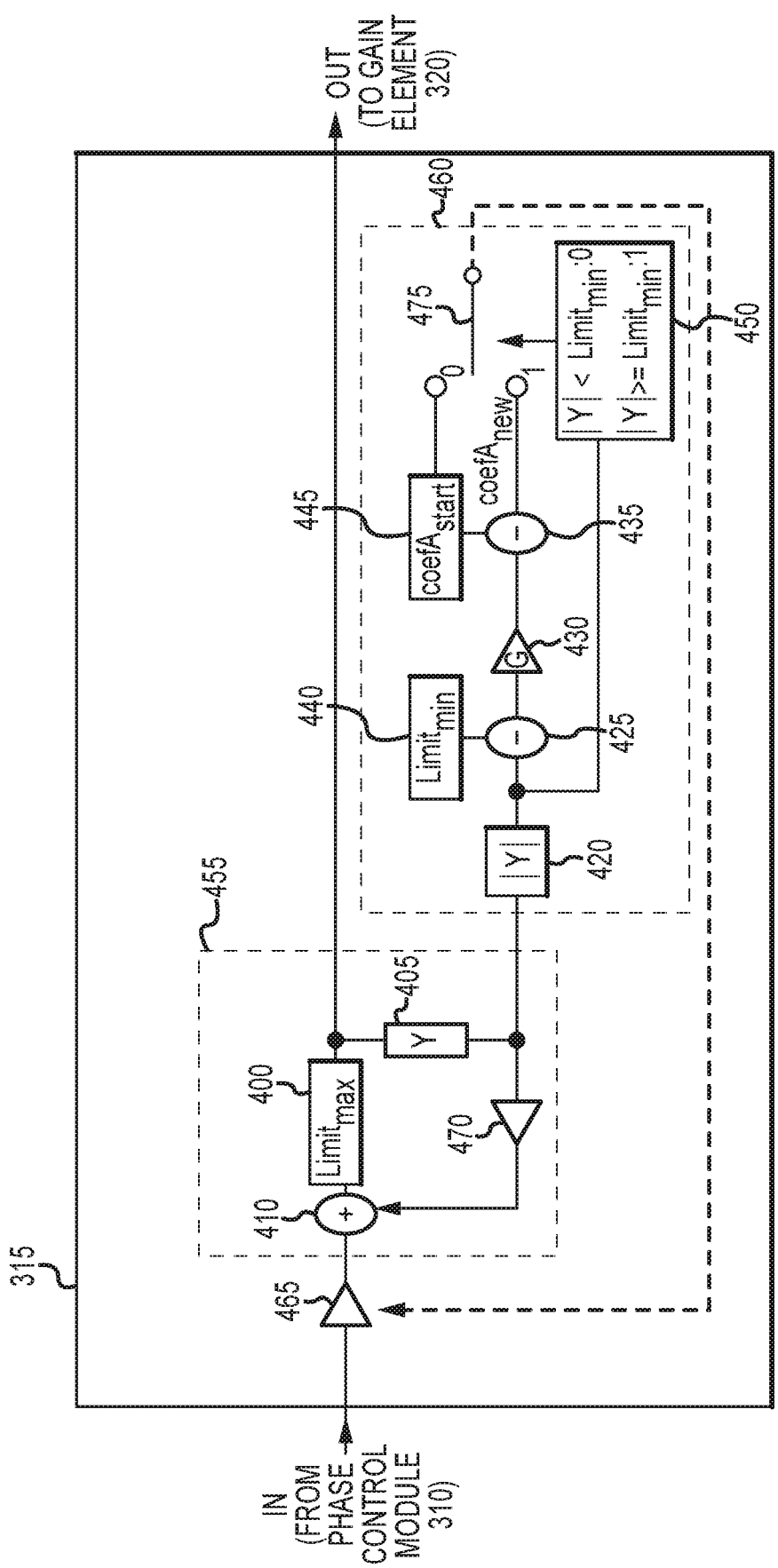
FIG. 4 is a block diagram of an integration module in accordance with an exemplary embodiment of the present technology.
Figure 5:
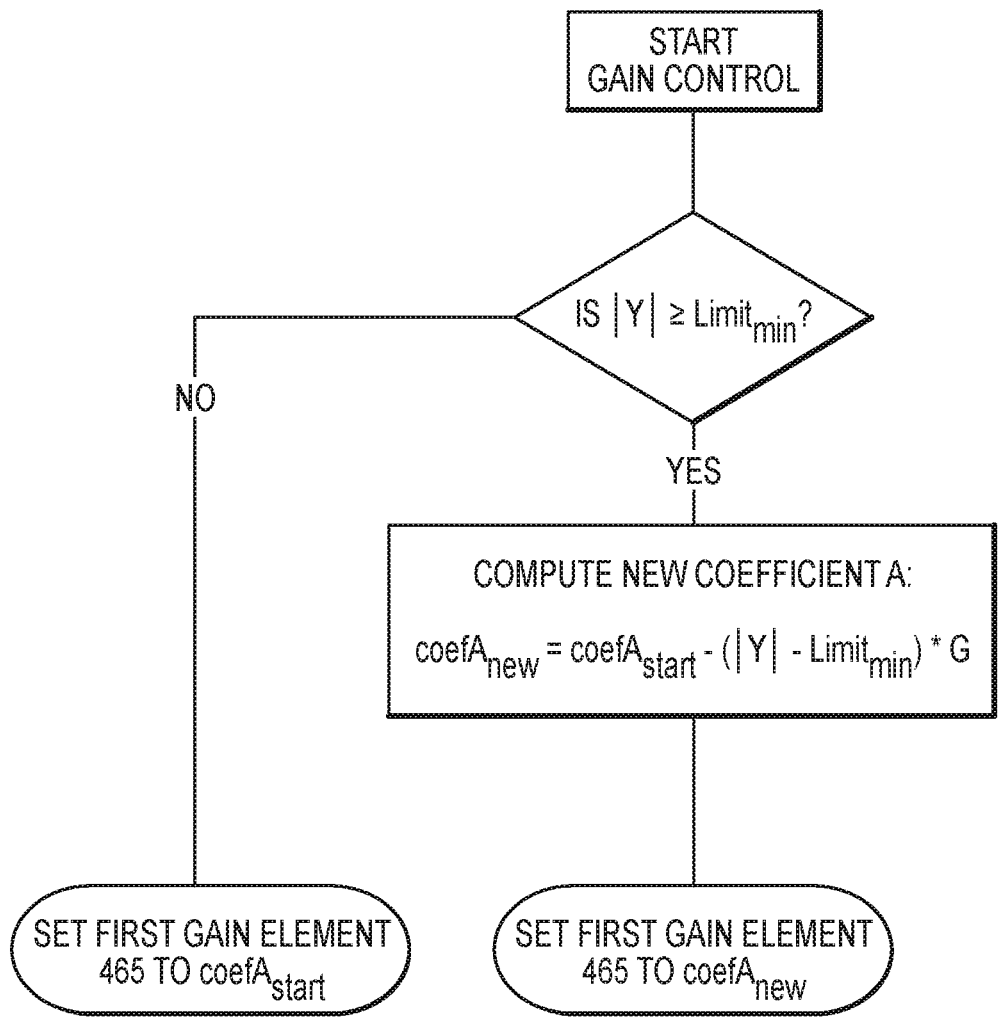
FIG. 5 is a flow chart for controlling the gain of a signal in accordance with an exemplary embodiment of the present technology.

Referring to FIGS. 4 and 5, systems and methods according to various embodiments of the present technology may facilitate more effectively compensating for larger movements of the device 100. The systems and methods may operate to make it harder for the actuator 200 to reach its minimum and maximum limits, and therefore allow it to operate to compensate for an extended range of device movement. In an exemplary embodiment, the comparator 450 may operate in conjunction with the switch 475 to select one of the new coefficient A or to the starting coefficient A. For example, the comparator 450 may compare the absolute value of Y to $Limit_{min}$. If the absolute value of Y is less than $Limit_{min}$, then the comparator 450 may output a "0" and if the absolute value of Y is greater than or equal to $Limit_{min}$, then the comparator 450 may output a "1." The switch 475 may respond to the output of the comparator 450 by selecting one of two terminals, wherein one terminal represents the new coefficient A, as calculated above, and the second terminal represents the starting coefficient A. The switch 475 may be communicatively coupled to the first gain element 465, such that the value of coefficient A of the first gain element 465 is set according to the selection of the switch 475.

According to various embodiments and referring to Table 1 below, an example input sequence of angular velocities and the integration module 315 output is provided with the exemplary values described above. The sequence of angular velocities represents a hypothetical movement of the device 100. All values are in arbitrary units for illustration purposes. Coefficients C and Z are assumed to be 1.0 in this example.

TABLE 1

| Sample # | IN (input to integration module 315) | Coefficient A | Y/OUT (output of integration module 315) | $Limit_{min}$ | G | New coefficient A |
|---|---|---|---|---|---|---|
| 1 | 0.25 | 1.000 | 0.250 | 0.3 | 0.294 | 1.000 |
| 2 | 0.25 | 1.000 | 0.500 | 0.3 | 0.294 | 0.941 |
| 3 | 0.25 | 0.941 | 0.735 | 0.3 | 0.294 | 0.872 |
| 4 | 0.25 | 0.872 | 0.953 | 0.3 | 0.294 | 0.808 |
| 5 | 0.25 | 0.808 | 1.155 | 0.3 | 0.294 | 0.749 |
| 6 | 0.25 | 0.749 | 1.342 | 0.3 | 0.294 | 0.694 |
| 7 | 0.25 | 0.694 | 1.516 | 0.3 | 0.294 | 0.643 |
| 8 | 0.25 | 0.643 | 1.676 | 0.3 | 0.294 | 0.595 |
| 9 | 0.2 | 0.595 | 1.795 | 0.3 | 0.294 | 0.560 |
| 10 | 0.12 | 0.560 | 1.863 | 0.3 | 0.294 | 0.541 |
| 11 | 0.05 | 0.541 | 1.890 | 0.3 | 0.294 | 0.533 |
| 12 | 0 | 0.533 | 1.890 | 0.3 | 0.294 | 0.533 |
| 13 | 0 | 0.533 | 1.890 | 0.3 | 0.294 | 0.533 |
| 14 | −0.25 | 0.533 | 1.756 | 0.3 | 0.294 | 0.572 |
| 15 | −0.25 | 0.572 | 1.613 | 0.3 | 0.294 | 0.614 |
| 16 | −0.25 | 0.614 | 1.460 | 0.3 | 0.294 | 0.659 |

For example, Y may initially be set to 0, coefficient A may initially be set to 1, G may be set to 0.294, the limiter 400 may be set to 2.0, and $Limit_{min}$ may be set to 0.3. Referring to Table 1 and FIGS. 4 and 5, the first sample from the gyro sensor 145 is 0.25, it is multiplied by 1 (coefficient A), and the limiter 400 is not triggered and Y is set to 0.25. This value is output from the integration module 315, and ultimately used to by the actuator 200 to position the lens 130. The second sample is also 0.25 and multiplied by 1 (coefficient A has not changed from the starting value 1.0), the limiter 400 is not triggered, and the second sample is added to Y; Y therefore is now set to 0.5. Because 0.5 is greater than $Limit_{min}$, a new coefficient A is calculated as describe above, and is set to 0.941. The third sample is 0.25 and is multiplied by coefficient A which is now 0.941. This reduced amount is then added to the current Y, for a total of 0.735. This is greater than $Limit_{min}$ so a new coefficient A is calculated as described above, and set to 0.872. This process continues as shown in the example of Table 1. If coefficient A were not recalculated as described herein, Y would reach the maximum limit (e.g., 2.0) of the limiter 400 after the eighth sample. By calculating a new coefficient A as described herein, Y does not reach the maximum limit for the given example, but instead increases more slowly as the input movement becomes greater. This allows the actuator 200 to compensate for additional movements before reaching the minimum or maximum limits. For clarity, input movement is represented by the accumulation of one or more gyro sensor 145 samples (e.g., a movement can happen over the course of many gyro sensor 145 samples).

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A processing circuit for a gyro signal, comprising:
an amplifier configured to apply a gain to the gyro signal and generate an amplified gyro signal;
an integration circuit connected to an output terminal of the amplifier and configured to:
receive the amplified gyro signal;
compute a first value using the amplified gyro signal; and
adjust the first value to a predetermined maximum value if the first value is greater than the predetermined maximum value; and
a gain control circuit configured to:
compute a first coefficient based on the first value;
select one of: the first coefficient or a second coefficient; and
adjust the gain according to the selected coefficient.

2. The processing circuit according to claim 1, wherein the gain control circuit computes the first coefficient based on the second coefficient.

3. The processing circuit according to claim 1, wherein the gain control circuit computes the first coefficient based on a predetermined minimum value.

4. The processing circuit according to claim 3, wherein the predetermined minimum value is less than the predetermined maximum value.

5. The processing circuit according to claim 1, wherein the gain control circuit is further configured to compute an absolute value of the first value.

6. The processing circuit according to claim 1, wherein the gain control circuit selects the first coefficient if an absolute value of the first value is greater than or equal to the predetermined minimum value.

7. The processing circuit according to claim 1, wherein the gain control circuit selects the second coefficient if the absolute value of the first value is less than the predetermined minimum value.

8. A method for adjusting a gain of a gyro signal, comprising:
amplifying the gyro signal using a variable gain;
computing a first value using the amplified gyro signal and a predetermined maximum value;
computing a new coefficient using the first value, a predetermined minimum value and a starting coefficient;
selecting one of the new coefficient or the starting coefficient as an output value; and
adjusting the variable gain of the gyro signal according to the at least one of the new coefficient or the starting coefficient.

9. The method according to claim 8, wherein selecting one of the new coefficient or the starting coefficient as the output value comprises comparing an absolute value of the first value to the predetermined minimum value.

10. The method according to claim 8, wherein the new coefficient is selected if an absolute value of the first value is greater than or equal to the predetermined minimum value.

11. The method according to claim 8, wherein the starting coefficient is selected if the absolute value of the first value is less than the predetermined minimum value.

12. The method according to claim 8, wherein computing the first value comprises limiting the first value to the predetermined maximum value.

13. A system, comprising:
a gyro sensor configured to generate a gyro signal;
a processing circuit connected to the gyro sensor and comprising:
at least one of: a noise cancelling circuit, an offset cancelling circuit, or a phase control circuit;
an integration module connected to an output terminal of the at least one of the noise cancelling circuit, the offset cancelling circuit, and the phase control circuit; wherein the integration circuit is configured to:
amplify the gyro signal using a variable gain and generate an amplified gyro signal;
compute a first value using the amplified gyro signal and a predetermined maximum value;
compute a new coefficient based on a predetermined minimum value and a starting coefficient;
select one of the new coefficient or the starting coefficient as an output value; and
adjust the variable gain of the gyro signal according to the selected coefficient.

14. The system according to claim 13, wherein the integration module comprises an amplifier configured to receive the gyro signal and control the gain of the gyro signal according to the at least one of the new coefficient and the starting coefficient.

15. The system according to claim 13, wherein computing the new coefficient is further based on the first value.

16. The system according to claim 13, wherein computing the first value comprises limiting the first value to the predetermined maximum value.

17. The system according to claim 13, wherein the integration module is further configured to compute an absolute value of the first value.

18. The system according to claim 13, wherein selecting one of the new coefficient or the starting coefficient as the output value comprises comparing an absolute value of the first value to the predetermined minimum value.

19. The system according to claim 13, wherein the new coefficient is selected if an absolute value of the first value is greater than or equal to the predetermined minimum value.

20. The system according to claim 13, wherein the starting coefficient is selected if the absolute value of the first value is less than the predetermined minimum value.

\* \* \* \* \*